US012608493B2

(12) United States Patent　　　　　(10) Patent No.:　US 12,608,493 B2
Cho et al.　　　　　　　　　　　　　　　(45) Date of Patent:　Apr. 21, 2026

(54) SYSTEMS AND METHODS FOR MUTUAL TRUST ESTABLISHMENT AMONG COMPONENTS OF AN INFORMATION HANDLING SYSTEM

(71) Applicant: Dell Products, L.P., Round Rock, TX (US)

(72) Inventors: Eugene David Cho, Austin, TX (US); Milton Olavo Decarvalho Taveira, Round Rock, TX (US); Travis Gilbert, Round Rock, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 176 days.

(21) Appl. No.: 18/490,870

(22) Filed: Oct. 20, 2023

(65) Prior Publication Data

US 2025/0131111 A1　　Apr. 24, 2025

(51) Int. Cl.
*G06F 21/60*　　　　　(2013.01)
(52) U.S. Cl.
CPC ................................. *G06F 21/606* (2013.01)
(58) Field of Classification Search
CPC .............................. G06F 21/606; G06F 21/57
See application file for complete search history.

(56) References Cited

U.S. PATENT DOCUMENTS

| | | | | |
|---|---|---|---|---|
| 9,191,388 | B1 * | 11/2015 | Paczkowski | ............ H04L 63/10 |
| 2010/0153709 | A1 * | 6/2010 | Thomas | ................ H04L 9/0866 |
| | | | | 713/171 |

| | | | | |
|---|---|---|---|---|
| 2013/0346758 | A1 * | 12/2013 | LaMacchia | ............. G06F 21/76 |
| | | | | 713/189 |
| 2018/0082083 | A1 * | 3/2018 | Smith | .................... G06F 21/575 |
| 2018/0097639 | A1 * | 4/2018 | Gulati | ...................... G09C 1/00 |
| 2018/0196951 | A1 * | 7/2018 | Hoppert | ............. G06F 15/7871 |
| 2018/0205553 | A1 * | 7/2018 | Hoppert | ................ H04L 9/3247 |

(Continued)

OTHER PUBLICATIONS

Eugene David Cho, et al., "Systems and Methods to Support Drift Detection in Complex Information Handling System Platforms Comprised of Replaceable Components," U.S. Appl. No. 18/184,134, filed Mar. 15, 2023.

(Continued)

*Primary Examiner* — Sarah Su
*Assistant Examiner* — Ethan V Vo
(74) *Attorney, Agent, or Firm* — Fogarty LLP

(57) ABSTRACT

Systems and methods for mutual trust establishment among components of an Information Handling System (IHS) are described. In an illustrative, non-limiting embodiment, an IHS may include: at least one processor; and at least one memory coupled to the processor, wherein the at least one memory comprises program instructions stored thereon that, upon execution by the at least one processor, cause the at least one processor to: obtain a plurality of identifiers for a respective plurality of CPLDs or FPGAs, including an identifier for a first CPLD or FPGA; and provide to a second CPLD or FPGA an expected handshake token for the first CPLD or FPGA, wherein the expected handshake token is based, at least in part, on the identifier for the first CPLD or FPGA, and wherein the second CPLD or FPGA uses the expected handshake token to establish trust for communication with the first CPLD or FPGA.

20 Claims, 7 Drawing Sheets

400￫

(56) References Cited

U.S. PATENT DOCUMENTS

| | | | |
|---|---|---|---|
| 2019/0245704 A1* | 8/2019 | Pala | H04L 67/34 |
| 2020/0366487 A1* | 11/2020 | Neve De Mevergnies | H04L 9/3297 |
| 2023/0090760 A1* | 3/2023 | Liew | G01R 31/31719 713/167 |
| 2024/0061964 A1* | 2/2024 | Faasse | G06F 21/572 |

OTHER PUBLICATIONS

Eugene David Cho, et al., "Systems and Methods for Secure Modular Hardware Binding," U.S. Appl. No. 18/450,145, filed Aug. 15, 2023.

* cited by examiner

SYSTEMS AND METHODS FOR MUTUAL TRUST ESTABLISHMENT AMONG COMPONENTS OF AN INFORMATION HANDLING SYSTEM

FIELD

This disclosure relates generally to Information Handling Systems ("IHSs"), and more specifically, to systems and methods for mutual trust establishment among components of an IHS.

BACKGROUND

As the value and use of information continues to increase, individuals and businesses seek additional ways to process and store it. One option available to users is an Information Handling System ("IHS"). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

The Open Compute Project's ("OCP's") Datacenter-Modular Hardware System ("DC-MHS") sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model ("SPDM") specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities. Datacenter, edge, and enterprise infrastructure may include various IHSs.

SUMMARY

Systems and methods for mutual trust establishment among components of an IHS are described. In an illustrative, non-limiting embodiment, an Information Handling System (IHS) may include: at least one processor; and at least one memory coupled to the at least one processor, where the at least one memory includes program instructions stored thereon that, upon execution by the at least one processor, cause the at least one processor to: obtain a plurality of identifiers for a respective plurality of Complex Programmable Logic Devices (CPLDs) or Field Programmable Gate Arrays (FPGAs), including an identifier for a first CPLD or FPGA; and provide to a second CPLD or FPGA an expected handshake token for the first CPLD or FPGA, where the expected handshake token is based, at least in part, on the identifier for the first CPLD or FPGA, and where the second CPLD or FPGA uses the expected handshake token to establish trust for communication with the first CPLD or FPGA.

In some embodiments, the second CPLD or FPGA is configured to: receive a handshake token from the first CPLD or FPGA; compare the handshake token received from the first CPLD or FPGA to the expected handshake token; and based, at least in part, on the comparison indicating a match, establish trust for communication with the first CPLD or FPGA. In some embodiments, the second CPLD or FPGA is configured to: receive a handshake token from the first CPLD or FPGA; compare the handshake token received from the first CPLD or FPGA to the expected handshake token; and based, at least in part, on the comparison not indicating a match, perform one or more responsive actions.

In some embodiments, the one or more responsive actions include setting a recover or reprovision mode flag. In some embodiments, the second CPLD or FPGA uses the expected handshake token to establish trust for communication with the first CPLD or FPGA on a low-privileged interface (LPI). In some embodiments, the LPI includes either a Serial Peripheral Interface (SPI), a Inter-Integrated Circuit (I²C), or a Universal Asynchronous Receiver-Transmitter (UART) interface. In some embodiments, the expected handshake token is provided to the second CPLD or FPGA on a high-privileged interface (HPI). In some embodiments, the HPI includes a Joint Test Action Group (JTAG) interface.

In some embodiments, the at least one processor is a trusted entity. In some embodiments, the at least one processor is a platform Root-of-Trust (PROT). In some embodiments, the identifier for the first CPLD or FPGA includes a cryptographic identity certificate of the first CPLD or FPGA. In some embodiments, the first CPLD or FPGA is a Secure Control Module (SCM) CLPD, where the second CPLD or FPGA is a Host Processor Module (HPM) CPLD.

In some embodiments, to provide to the second CPLD or FPGA the expected handshake token, the program instructions, upon execution, further cause the at least one processor to: determine that a flag is set denoting that provisioning is needed for the second CPLD or FPGA; and provide the expected handshake token to the second CPLD or FPGA based, at least in part, on the flag being set. In some embodiments, the second CPLD or FPGA is configured to: determine that at least the expected handshake token is needed; and set the flag denoting that provisioning is needed for the second CPLD or FPGA. In some embodiments, the expected handshake token is a volatile token. In some embodiments, the expected handshake token is a non-volatile token.

In another illustrative, non-limiting embodiment, a method includes: obtaining, by a platform Root-of-Trust (PROT) or a Baseboard Management Controller (BMC) bootloader of an Information Handling System (IHS), a plurality of identifiers for a plurality of Complex Programmable Logic Devices (CPLDs) or Field Programmable Gate Arrays (FPGAs), including an identifier for a first CPLD or FPGA; providing, by the PROT or BMC bootloader to a second CPLD or FPGA, an expected handshake token for the first CPLD or FPGA, where the expected handshake token is based, at least in part, on the identifier for the first CPLD or FPGA; and establishing, by the second CPLD or FPGA, trust for communication with the first CPLD or FPGA based, at least in part, on the expected handshake token.

In some embodiments, establishing, by the second CPLD or FPGA, trust for communication with the first CPLD or FPGA further includes: receiving, by the second CPLD or FPGA, a handshake token from the first CPLD or FPGA; comparing, by the second CPLD or FPGA, the handshake token received from the first CPLD or FPGA to the expected handshake token; and based, at least in part, on the comparison indicating a match, establishing, by the second CPLD or FPGA, trust for communication with the first CPLD or FPGA. In some embodiments, the expected handshake token for the first CPLD or FPGA is provided by the PROT or BMC bootloader to the second CPLD or FPGA on a high-privileged interface (HPI), where the trust for communication with the first CPLD or FPGA is established for a low-privileged interface (LPI).

In another illustrative, non-limiting embodiment, one or more non-transitory computer-readable storage media store program instructions, that when executed on or across one or more processors, cause the one or more processors to: obtain a plurality of identifiers for individual ones of the plurality of Complex Programmable Logic Devices (CPLDs) or Field Programmable Gate Arrays (FPGAs), including an identifier for a first CPLD or FPGA; and provide to a second CPLD or FPGA an expected handshake token for the first CPLD or FPGA, where the expected handshake token is based, at least in part, on the identifier for the first CPLD or FPGA, and where the second CPLD or FPGA uses the expected handshake token to establish trust for communication with the first CPLD or FPGA.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
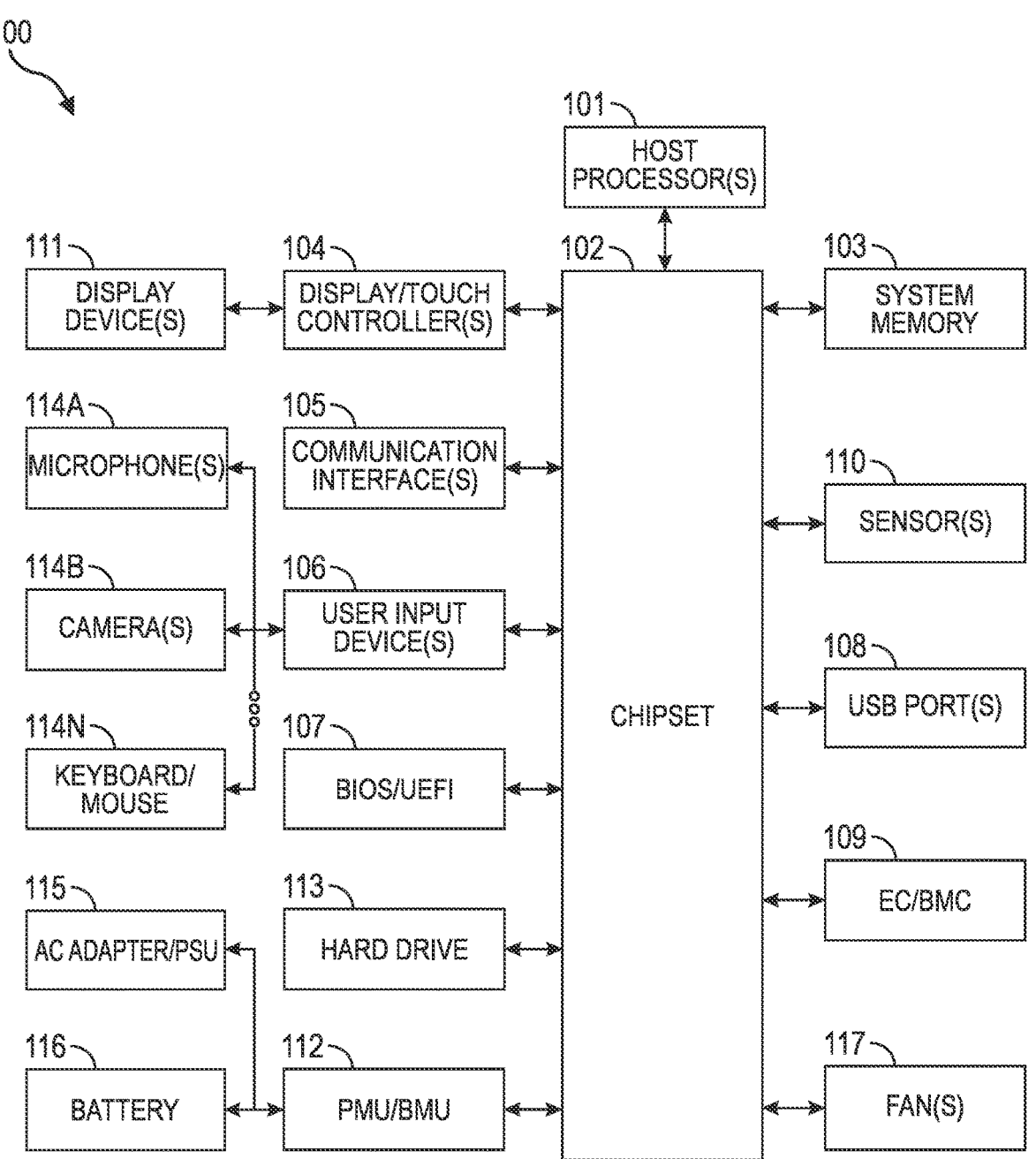
FIG. 1 is a diagram illustrating examples of hardware components of an Information Handling System (IHS), according to some embodiments.

FIG. 1 is a block diagram of hardware components of IHS 100, which may be used to implement the systems and methods for mutual trust establishment among components of an IHS.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
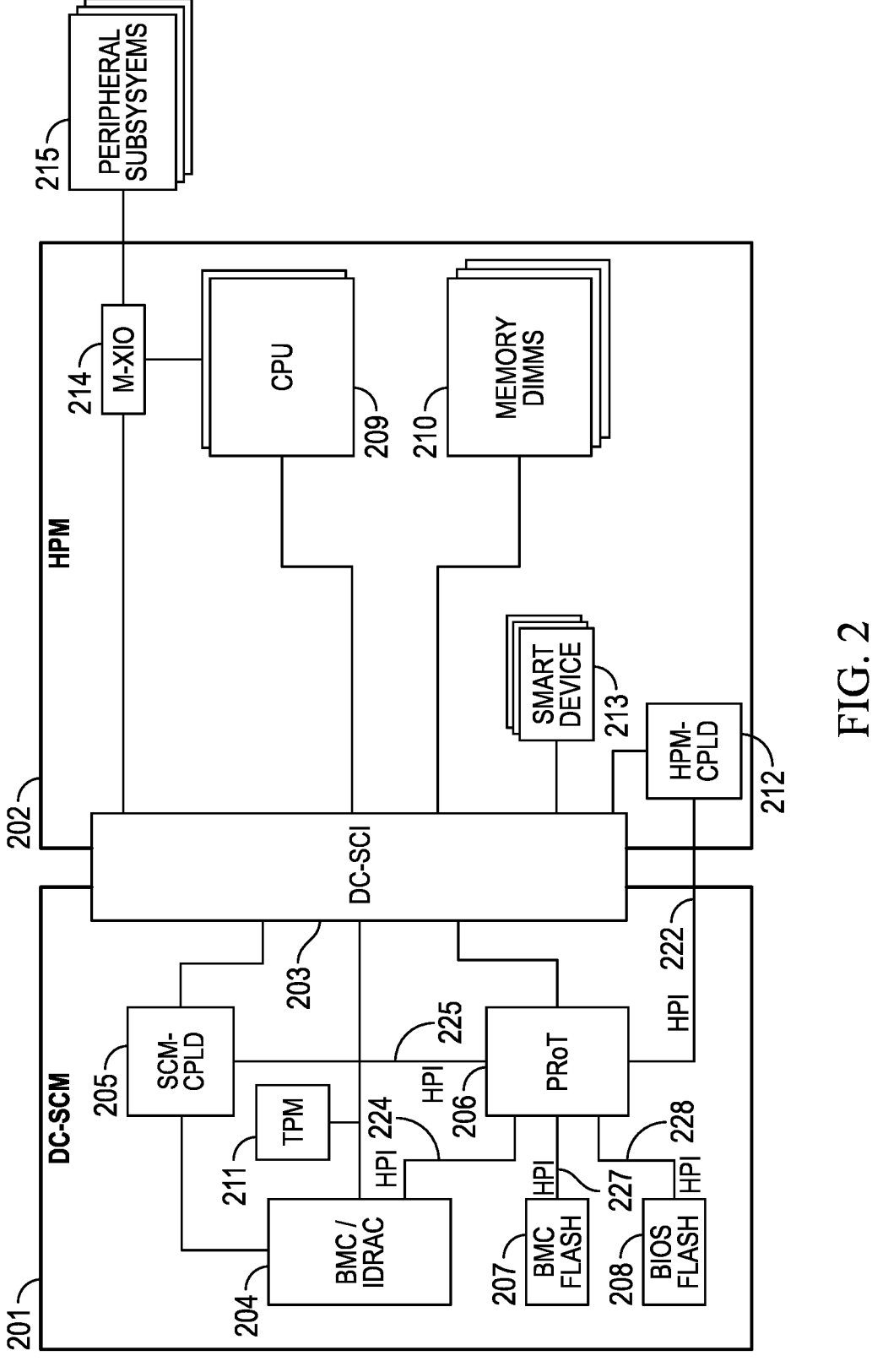
FIG. 2 is a block diagram illustrating multi-node building blocks of a Datacenter-Modular Hardware System ("DC-MHS") according to one embodiment of the present disclosure, according to some embodiments.

FIG. 2 is a block diagram illustrating multi-node building blocks of a Datacenter-Modular Hardware System ("DC-MHS") according to one embodiment of the present disclosure, according to some embodiments.

Modular server architectures give cloud service providers a variety of compute choices to meet market and business conditions, offer flexible configurations, and deliver innovative solutions. The Datacenter-Modular Hardware System ("DC-MHS"), which may be considered to form at least part of an IHS, provides interoperability between datacenter, edge, and enterprise infrastructure using consistent interfaces and modular building blocks. DC-MHS standardizes various Host Processor Module ("HPM") form factors and provides supporting elements for interoperability of HPMs across various platforms. The HPM is managed by a Datacenter-Secure Control Module ("DC-SCM"), which is designed to enable a common management and security infrastructure across platforms within a data center. The interface between the DC-SCM and the HPM can be referred to as the Datacenter-Secure Control Interface ("DC-SCI").

The HPM is a traditional CPU-memory device with the Baseboard Management Controllers ("BMCs") and security functions moved to the DC-SCM. HPMs are not limited to a standard processor architecture and can apply any processor architecture utilizing management and security features.

IHS vendors are manufacturing ever increasingly complex, and composable Hardware systems. A single IHS can now have an (ever expanding) number of CPLDs. CPLD Vendors offer Secured CPLDs, but the secured CPLDs often cost more for Secure Boot and Attestation Capabilities. DC-MHS can divide a single motherboard into pieces which can then assemble and/or operate together, in order to provide the same level of assurance as if they were a single complete motherboard with no interchange capabilities. While the interchange capabilities provided by DC-MHS has enhanced the configurability of IHSs, these capabilities can create security breaches when bad actors (e.g., hackers) are able to configure illicit subsystems on otherwise secured IHSs.

Secured CPLDs support Identity/Attestation abilities to perform Mutual Authentication, but such features often incur a surcharge (e.g., approximately three dollars per CPLD). Additionally, secured CPLDs can negatively impact continuity of CPLD supply. For example, adding additional hardware requirements (e.g., purpose built authenticator ICs) often decreases Motherboard Supply Chain Agility ("MSCA"). Vendors may have future use cases where Trusted Partners HPMs could be obtained without being modified for their supply chain. But introducing complex CPLD Logic (e.g., SPDM, Advanced Cryptographic capabilities, etc.) often has development and on-CPLD storage cost. This may be particularly problematic given that memory resources on CPLDs is often limited. Scalability may also be needed, as number of CPLDs per system is expected to continue to grow over time. As will be described in detail herein below, embodiments of the present disclosure provide a systems and methods for secure modular hardware binding using an encrypted secret key that is shared between a platform ROT, a DC-SCM, and a HPM associated with the DC-SCM.

Referring back to FIG. 2, DC-SCM 201 is coupled to HPM 202 via a datacenter secure control interface ("DC-SCI") 203. DC-SCI can be a mix of all types of interfaces, both high privilege interfaces ("HPIs") and low privileged interfaces ("LPIs"). Examples of LPIs are Serial Peripheral Interface ("SPI"), Inter-Integrated Circuit ("I²C"), Universal Asynchronous Receiver-Transmitter ("UART"), etc. The DC-SCM 201 consists of a BMC 204, which is a specialized service processor that monitors the physical state of the server. As a non-limiting example of a BMC 204, the integrated Dell Remote Access Controller (iDRAC) from DELL, INC. is embedded within DELL® PowerEdge servers and provides functionality that helps information technology (IT) administrators at remote operations centers deploy, update, monitor, and maintain servers with no need for any additional software to be installed.

An SCM complex programmable logic device (SCM-CPLD) 205 can contain application specific logic and a high-speed and scalable Low-voltage differential signaling Tunneling Protocol & Interface ("LTPI"). A Platform Root of Trust ("PROT") Security Processor 206 can be responsible for attesting the BMC, BIOS, and/or other firmware images on the system. It can also be responsible for attesting the SCM-CPLD 205 and the HPM-CPLD 212. The ProT 206 can have a separate High Privileged Interface ("HPI") to CPLDs (i.e., a Joint Test Action Group ("JTAG") interface). A HPI can be a highly-privileged PROT/BMC code interface (such as a dedicated security processor-PROT, or the BMC Bootloader). The HPI can be allowed for the on-boot authentication of bitstream code over this HPI, and for verifying the bitstream prior to load. In FIG. 2, the ProT 206 has a separate HPI 228 to the BIOS Flash 208, an HPI 227 to the BMC Flash 207, an HPI 224 to the BMC/iDRAC 204, an HPI 225 to the SCM-CPLD 205, and an HPI 222 to the HPM-CPLD 212.

The DC-SCM can also contain a Trusted Platform Module (TPM) 211, a BMC Flash 207, and a BIOS Flash 208. The TPM provides hardware-based, security-related functions for CPUs 209 through integrated cryptographic keys. The BMC Flash 207 can consist of one or more flash devices used to contain the BMC firmware image. The BIOS Flash 208 can consist of one or more flash devices used to contain the BIOS firmware image for each node.

HPM 202 represents a general form factor that allows for maximum input/output ("I/O") of CPUs 209 in the accessible slots. HPM 202 also includes memory or Dual In-line Memory Modules (DIMMs) 210. The HPM 202 form factor does not require a specific CPU 209 or memory 210 technology. Various HPM 202 form factors support different numbers of CPUs 209 and memory slots 210. The HPM specifications are adapted to allow multiple generations of compute core designs to fit into the form factor specification so that chassis and system designs can be reused as desired.

HPM-CPLD 212 can support data exchange between SCM-CPLD 205 and HPM 202 using LPTI, in some embodiments. In other configurations, HPM 202 may include other hardware components (not shown), such as memory devices, graphics processing units (GPU), peripheral I/O, etc.

HPM 202 may also include one or more smart devices 213, such as a Smart Network Interface Card (NIC), which is a programmable device used to improve data center networking performance, security, features, and flexibility. Other smart devices (e.g., HPM-CPLDs 212) may include, for example, smart network interface cards ("SmartNICs"), data processing units ("DPUs"), and infrastructure processing units ("IPUs").

In the DC-MHS environment an Extensible I/O (M-XIO) source connector 214 enables connectivity to peripheral subsystems 215. M-XIO 214 is a universal hardware API intended to enable the connectivity requirements of multiple different peripheral modules 215 without requiring a connector hardware. M-XIO 214 connector on HPM 202 includes a set of sideband signals that relies on circuitry to serialize/deserialize virtual wires that are tunneled over a 1-wire interface, called the Modular-Peripheral Sideband Tunneling Interface ("M-PESTI"). Peripheral subsystems 215 may include, for example, Enterprise and Datacenter Standard Form Factor ("EDSFF") devices, Redundant Array of Independent Disks ("RAID") controllers, Peripheral Component Interconnect Express ("PCIe") Card Electro-Mechanical ("CEM") cards, back planes, and OCP NIC 3.0 adapter cards. Other hardware interfaces and connectors to couple HPM 202 to chassis infrastructure elements and subsystems may follow the Platform Infrastructure Connectivity ("M-PIC") specification.

DC-MHS provides a family of specifications to enable interoperability between datacenter and enterprise infrastructure by providing consistent interfaces and form factors among modular building blocks. For example, the Open Compute Project® is developing the following HPM specifications. The Modular Hardware System Full Width Specification ("M-FLW") is an HPM form factor specification that is optimized for using the full width of a standard rack-mountable server. The Modular Hardware System Partial Width Density Optimized Specification ("M-DNO") is an HPM specification that is targeted to partial width, such as half-width or three-quarters-width, form factors.

The DC-SCM design can simplify the deployment of HPMs and increases the efficiency for time to market deployment for new systems. The DC-SCM can have a standardized pinout and definition, which provides common boot, monitoring, control, and remote debug for diverse platforms. DC-SCI 203 can support several PCIe bus options between DC-SCM 201 and HPM 202, including PCIe Gen 2.0 up to PCIe Gen 5.0 x1 interface, SPI interfaces, NC-SI RMII-based transport ("RBT") interface, LTPI, eSPI bus, and I²C/I³C bus, among others.

Figure 3:
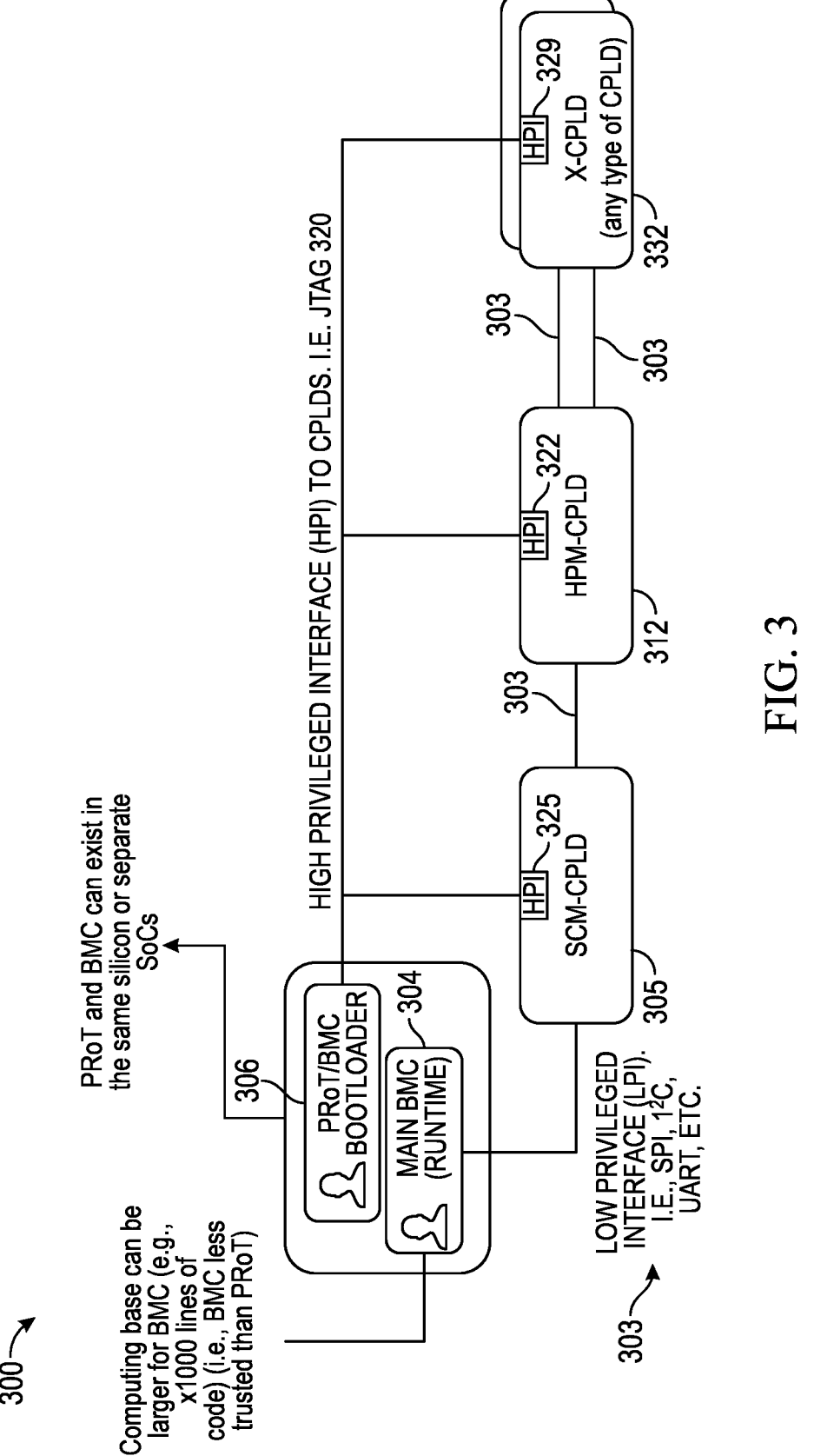
FIG. 3 illustrates an example of an IHS system with multiple Complex Programmable Logic Devices ("CPLDs") and/or Field Programmable Gate Arrays ("FPGAs"), according to some embodiments of the present disclosure.

FIG. 3 illustrates an example of an IHS system 300 with multiple Complex Programmable Logic Devices ("CPLDs") and/or Field Programmable Gate Arrays ("FPGAs"), according to some embodiments of the present disclosure. FIG. 3 depicts a PROT and/or BMC bootloader 306 and a main BMC 304 used for runtime. The trusted computing base can be much larger for the main BMC 304. For example, the trusted computing base for the main BMC 304 can have 1000 times more lines of code. The main BMC 304 is usually less trusted than the PROT and/or BMC bootloader 306. The PROT and BMC can exist in the same silicon or on separate systems on a chip (SoCs).

The PROT and/or BMC bootloader 306 can have a HPI 320 to multiple CPLDs and/or FPGAs. The PROT/BMC bootloader has a HPI 325 to the SCM-CPLD 305, a HPI 322 to the HPM-CPLD 312, and a HPI 329 to X-CPLD 332. X-CPLD 332 represents any other CPLDs or type of CPLDs that might be a part of system 300. A HPI can be a highly-privileged PROT/BMC code interface (such as a dedicated security processor-PROT, or the BMC Bootloader). The HPI can be allowed for the on-boot authentication of bitstream code over this HPI, and for verifying the bitstream prior to load.

The main BMC 304 can have a low-privileged interface ("LPI") 303 to multiple CPLDs and/or FPGAs. LPI 303 can be a low-privileged BMC code interface for runtime use of the main BMC 304 operating system. The majority of the bitstream interactions with the main BMC 304 are through this LPI path 303, which can be used for thermal management, or power management, etc. Examples of LPI 303 are SPI, I²C, UART, etc.

DC-MHS can drive standard interconnects between modular hardware components, which often have CPLDs and/or FPGAs to perform electrical operations for those components (e.g., power-on sequence on HPM, reset BMC on SCM, etc.). This can drive the need, therefore, for CPLDs and/or FPGAs to do some sort of trust establishment amongst themselves. Trust establishment should be supported on LPIs, as this is the only inter-CPLD or inter-FPGA interface. Therefore, CPLDs and/or FPGAs may have to handshake early on in the power sequence before "Smart" entities are up. Smart entities can be the man BMC 304, etc., Upgrading the CPLD to a secured version might only support CPLD Identity Attestation and/or SPDM across the HPI.

Therefore, there is a need for CPLDs and/or FPGAs to do some sort of trust establishment amongst themselves on the LPIs. Such an implementation should be simple and scalable. Such an implementation should be efficient in terms of CPLD logic development and should work across many CPLDs. Such an implementation should not require any upgrading of CPLDs to any secured version requiring additional hardware, because of cost sensitivities.

Figure 4:
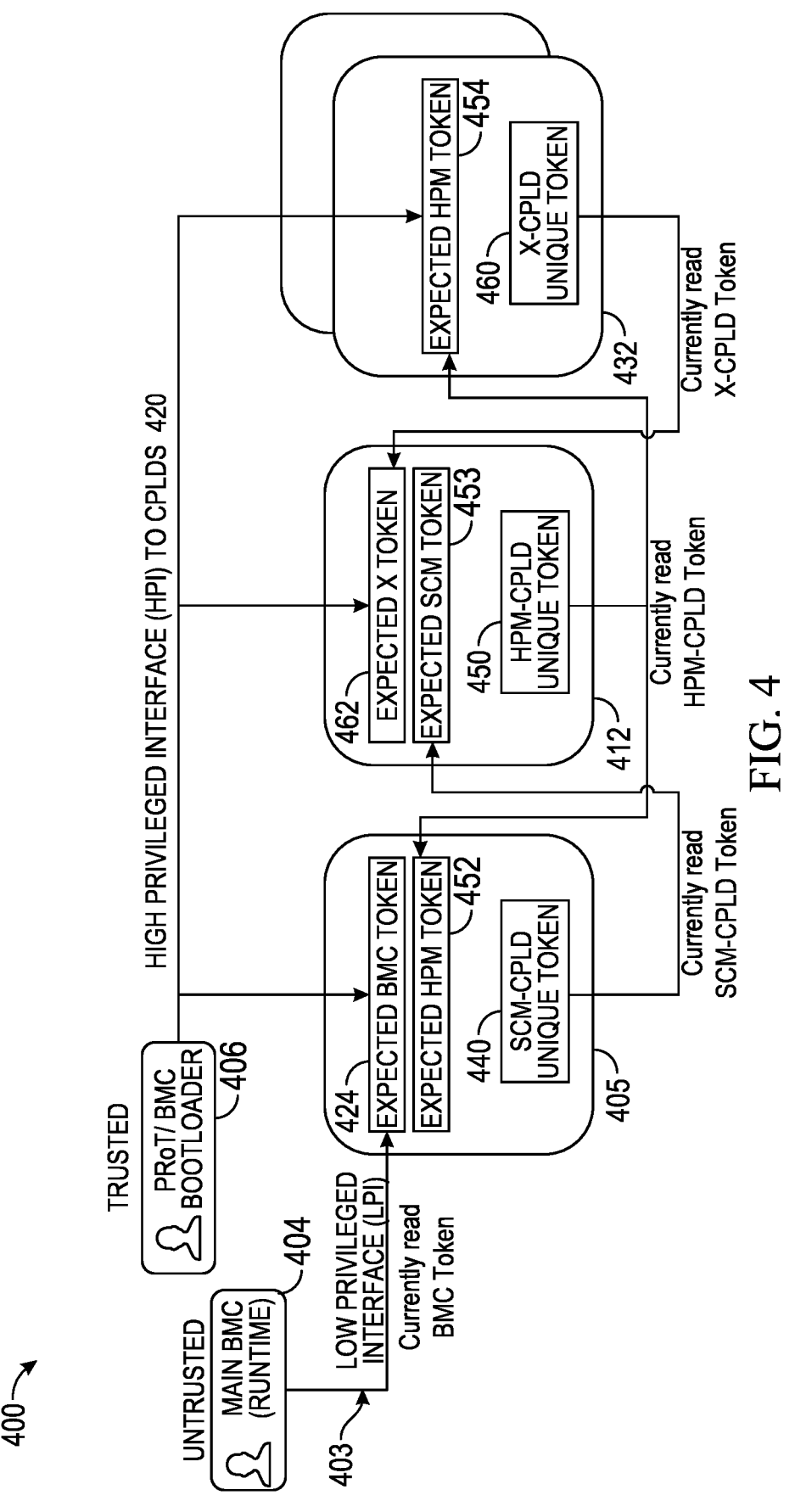
FIG. 4 illustrates an example of a system for mutual trust establishment among CPLDs and/or FPGAs of an IHS, according to some embodiments of the present disclosure.

FIG. 4 illustrates an example of a system for mutual trust establishment among CPLDs and/or FPGAs of an IHS, according to some embodiments of the present disclosure. Some embodiments of the systems and methods for mutual trust establishment among components of an IHS, described herein, provide for a trusted PROT to act as a centralized expected token management entity. Some embodiments can also support issuing unique per-CPLD tokens if native CPLD capabilities are not used. Some embodiments can use, as the unique token, a CPLD unique ID ("UID") (i.e., serial number, certificate, or similar) of the CPLD. Some embodiments can use HPI to establish trust on the LPI. Some embodiments can provide a capability for an untrusted BMC to establish trust with CPLDs across the LPI. Some embodiments can support inter-CPLD drift-detection.

Some embodiments can provide at least some these features, as well as other features, using a minimal amount of CPLD logic and at a low cost. Some embodiments are highly scalable solutions across complex CPLD hierarchies. If, in the future, secured and/or ROT CPLDs are used to support SPDM over LPI, then some embodiments of the present disclosure can help offload key portions of the protocol to a more capable entity (e.g., expected measurements, identity, nonce-signatures, etc.).

As with FIG. 3, the trusted PROT/BMC bootloader 406 has an HPI 420 to the SCM-CPLD 405, the HPM-CPLD 412, and the X-CPLD 432. The untrusted main BMC 404 can have a low-privileged interface ("LPI") 403 to multiple CPLDs and/or FPGAs. LPI 403 can be a low-privileged BMC code interface for runtime use of the main BMC 404 operating system.

As depicted in FIG. 4, a trusted Entity PROT and/or BMC bootloader 406 can provision over the HPI 420 expected handshake tokens amongst the CPLDs (405, 412, 432), such that trust can be established on the LPI 403. Tokens can be used as simple proof exchange mechanism between CPLDs. For example, the SCM-CPLD unique token 440 of the SCM-CPLD 405 can be provisioned over the HPI 420 to the HPM-CPLD 412 as the expected SCM token 453. The HPM-CPLD unique token 450 of the HPM-CPLD 412 can be provisioned over the HPI 420 to the SCM-CPLD 405 as the expected HPM token 452, and can be provisioned over the HPI 420 to the X-CPLD 432 as the expected HPM token 454. The X-CPLD unique token 460 of the X-CPLD 432 can be provisioned over the HPI 420 to the HPM-CPLD 412 as the expected X token 462. A unique token of the main BMC 404 can be provisioned over the HPI 420 to the SCM-CPLD 405 as the expected BMC token 424.

Figure 7:
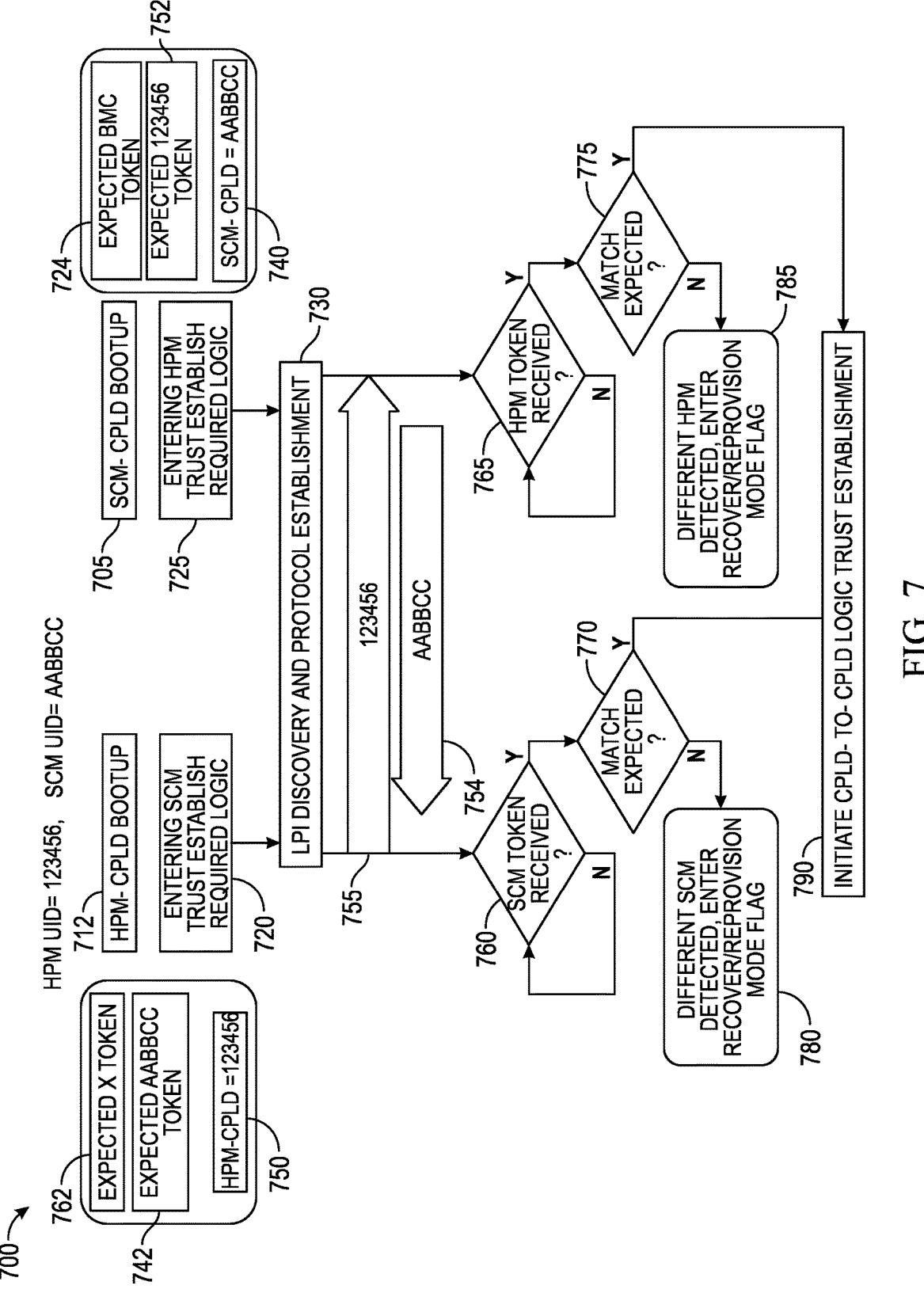
FIG. 7 illustrates an example flow diagram of a method for mutual trust establishment among CPLDs and/or FPGAs of an IHS, depicting trust establishment between a Datacenter-Host Processor Module ("DC-HPM") and a Datacenter- Secure Control Module ("DC-SCM"), according to some embodiments of the present disclosure.

Then the various unique tokens can be provided and/or read (or more generally obtained), as more specifically discussed in FIG. 7, by/to the other CPLDs, in order for those other CPLDs to compare the provided and/or read (or more generally obtained) token against the expected token. For example, SCM-CPLD unique token 440 can be provided by the SCM-CPLD 405 to the HPM-CPLD 412 (and/or read by the HPM-CPLD 412 from the SCM-CPLD 405), in order for the HPM-CPLD 412 to compare it against the expected SCM token 453. As another example, the X-CPLD unique token 460 can be provided by the X-CPLD 432 to the HPM-CPLD 412 (and/or read by the HPM-CPLD 412 from the X-CPLD 412), in order for the HPM-CPLD 412 to compare it against the expected X token 462.

CPLD expected tokens can be non-volatile and provisioned sparingly only in factory or component replacement, or they can be volatile and be provisioned every AC Cycle by the PROT and/or BMC bootloader 406.

Figure 5:
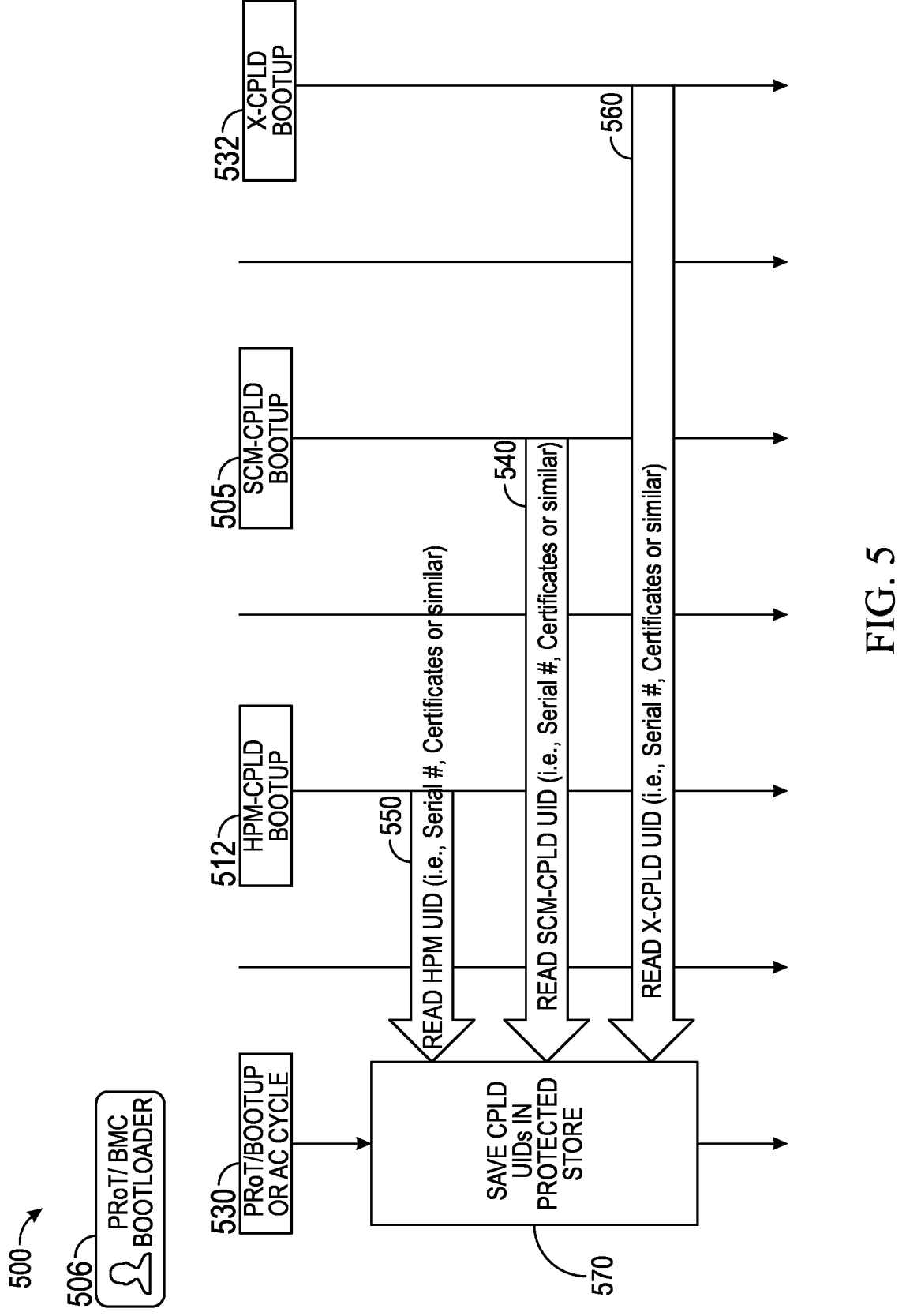
FIG. 5 illustrates an example flowchart of a method for mutual trust establishment among CPLDs and/or FPGAs of an IHS, depicting harvesting unique tokens that include a CPLD unique identifier ("UID"), according to some embodiments of the present disclosure.

FIG. 5 illustrates an example flowchart 500 of a method for mutual trust establishment among CPLDs and/or FPGAs of an IHS, depicting harvesting unique tokens that include a CPLD unique identifier "(UID")", according to some embodiments of the present disclosure. A UID can be one or more serial number(s), one or more certificate(s) such as a cryptographic identity certificate(s), or something similar. The terms UID and identifier are general terms that can encompass these examples, as well as other types of both cryptographic and non-cryptographic identifiers.

In FIG. 5, the PROT and/or BMC bootloader 506 performs a PROT bootup of A/C cycle 530. During the PROT bootup of A/C cycle 530 the various CPLDs (512, 505, 532), or FPGAs in other embodiments, provide their UID (i.e., serial number, certificate, or similar) to the PROT or BMC bootloader 506. In some embodiments, the PROT or BMC bootloader 506 reads this information from the CPLDs, while in other embodiments the CPLDs push this information to the PROT or BMC bootloader 506 without a read. No matter the specific way, the PROT or BMC bootloader 506 obtains (either through a read or in absence of a read) the UID (i.e., serial number, certificate, or similar) from the various CPLDs (or FPGAs, depending on the embodiment).

In the specific embodiment of FIG. 5, for example, the PROT or BMC bootloader 506 reads an HPM UID (i.e., serial number, certificate, or similar) 550 from the HPM-CPLD bootup system or process 512. As another example, the PROT or BMC bootloader 506 reads the SCM-CPLD UID (i.e., serial number, certificate, or similar) 540 from the SCM-CPLD boot system or process 505. As another example, the PROT or BMC bootloader 506 reads the X-CPLD UID (i.e., serial number, certificate, or similar) 560 from the X-CPLD bootup system or process 532. The HPM-CPLD bootup system or process 512 can save the various CPLD (or FPGA) UIDs (i.e., serial numbers, certificates, or similar) in a protected store 570.

Figure 6:
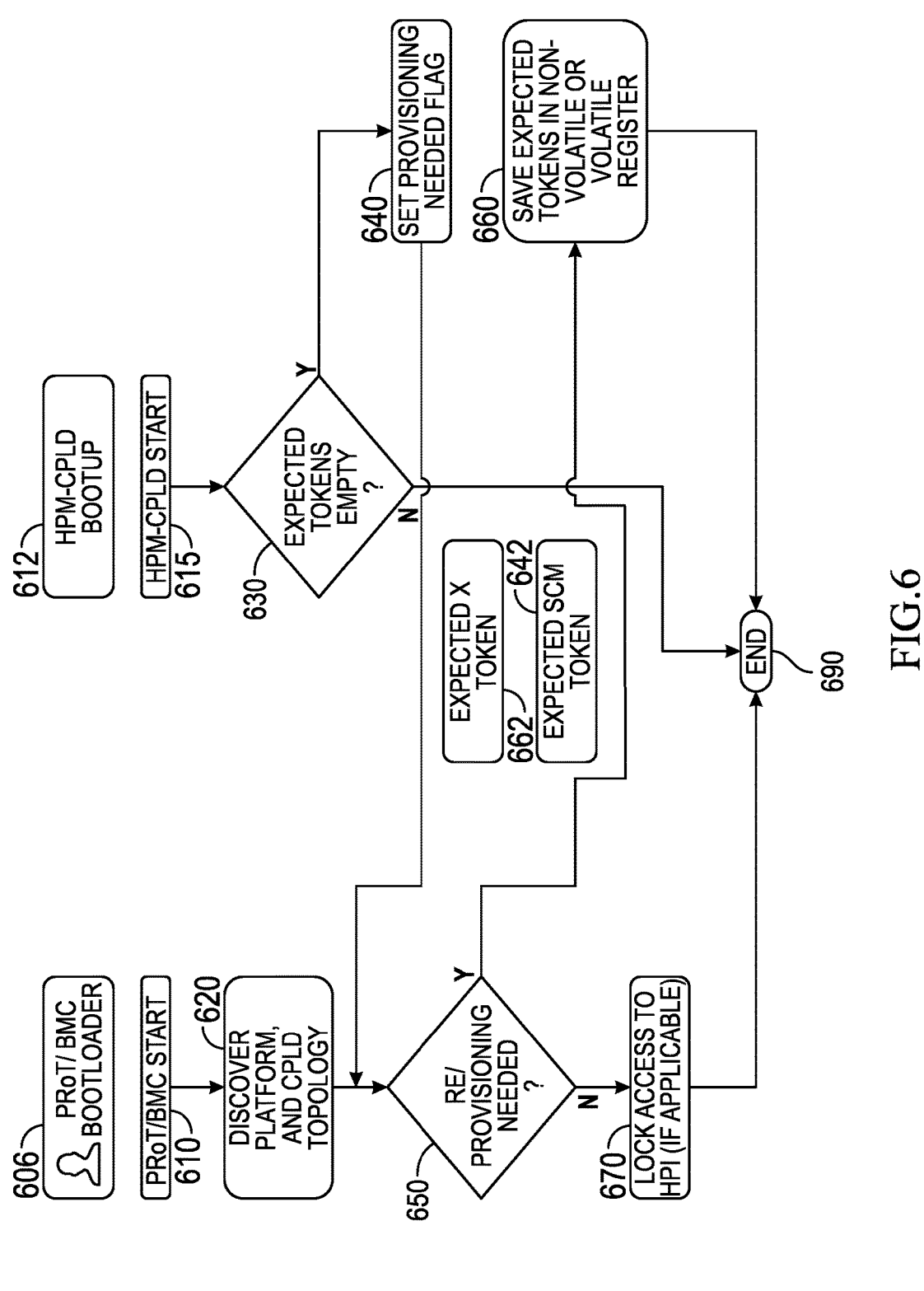
FIG. 6 illustrates an example flow diagram of a method for mutual trust establishment among CPLDs and/or FPGAs of an IHS, depicting provisioning expected tokens, according to some embodiments of the present disclosure.

FIG. 6 illustrates an example flow diagram of a method for mutual trust establishment among CPLDs and/or FPGAs of an IHS, depicting provisioning expected tokens, according to some embodiments of the present disclosure. FIG. 6 begins with the PROT or BMC bootloader 606 starting the PROT and or BMC bootloader process 610. FIG. 6 also begins with the HPM-CPLD bootup system or process 612 starting the HPM-CPLD process 615. The PROT or BMC bootloader 606 discovers a platform and/or CPLD (and/or FPGA) topology 620. The HPM-CPLD bootup system or process 612, at block 630, determines if the expected tokens are empty in its expected token storage. If the expected tokens are not empty at 630, then the flowchart ends and 690. If the expected tokens are empty, then a provisioning needed flag is set 640.

This provisioning needed flag is then read by the PROT or BMC bootloader 606. The PROT or BMC bootloader 606 determines, at block 650, if provisioning or re-provisioning is needed. If provisioning or re-provisioning is not needed at 650, then the PROT or BMC bootloader 606 locks access to the HPI (if applicable) at block 670, after which the flowchart ends at 690. If provisioning or re-provisioning is needed at 650, then the PROT or BMC bootloader 606 provides the expected X token 662 and/or the expected SCM token 642 to the HPM-CPLD bootup system or process 612.

The HPM-CPLD bootup system or process 612 saves 660 the expected tokens in one or more non-volatile or volatile registers. Then the flowchart transitions to the end at 690.

This same process of FIG. 6 for the HPM-CPLD can be repeated for the SCM-CPLD and the X-CPLD, in some embodiments. The method or process depicted in FIG. 6 would be the same for the SCM-CPLD or the X-CPLD, except for the expected tokens provided to the SCM-CPLD or the X-CPLD respectively. For example, regarding the SCM-CPLD, the PROT or BMC bootloader 606 can provides the expected BMC token and/or the expected HPM token to the SCM-CPLD bootup system or process. As another example, regarding the X-CPLD, the PROT or BMC bootloader 606 can provide the expected HPM token to the X-CPLD bootup system or process.

FIG. 7 illustrates an example flow diagram of a method for mutual trust establishment among CPLDs and/or FPGAs of an IHS, depicting trust establishment between a Datacenter-Host Processor Module ("DC-HCM") and a Datacenter-Secure Control Module ("DC-SCM"), according to some embodiments of the present disclosure. In this example of FIG. 7, for illustrative purposes only, the DC-HPM has a UID of "123456" (750), and the DC-SCM has a UID of "AABBCC" (740). In addition, it is assumed that the DC-HPM already has possession of an expected X-CPLD token 762, and an expected DC-SCM token 742 which has the value of "AABBCC." In addition, it is also assumed that the DC-SCM already has possession of an expected BMC token 724, and an expected DC-HPM token 752 which has the value of "123456."

The HPM-CPLD bootup system or process 712 begins by entering required logic to establish trust 720 with the DC-SCM. Similarly, the SCM-CPLD bootup system or process 705 begins by entering required logic to establish trust 725 with the DC-HCM. The flow diagram then proceeds to an LPI discovery and protocol establishment 730 for both the HPM-CPLD bootup system or process 712 and the SCM-CPLD bootup system or process 705.

At 755 the HPM-CPLD bootup system or process 712 provides its UID (i.e., serial number, certificate, or similar) to the SCM-CPLD. Similarly, at 754, the SCM-CPLD bootup system or process 705 provides its UID (i.e., serial number, certificate, or similar) to the HPM-CPLD. At 760 the HPM-CPLD bootup system or process 712 determines if the SCM token was received. If the SCM token was not received, the HPM-CPLD bootup system or process 712 returns to 760. If the SCM token was received at 760, then the HPM-CPLD bootup system or process 712 determines if the received SCM token matches the expected SCM token at 770. If the received SCM token does not match the expected SCM token at 770, then the flowchart transitions to 780 in which a different SCM token is detected, and/or a recover and/or a re-provision mode flag is set.

At 765 the SCM-CPLD bootup system or process 705 determines if the HPM token was received. If the HPM token was not received, the HPM-CPLD bootup system or process 712 returns to 760. If the SCM token was received at 765, then the SCM-CPLD bootup system or process 705 determines if the received HPM token matches the expected HPM token at 775. If the received HPM token does not match the expected HPM token at 775, then the flowchart transitions to 785 in which a different HPM token is detected, and/or a recover and/or a re-provision mode flag is set.

If the received SCM token does match the expected SCM token at 770, and the received HPM token matches the expected HPM token at 775, then the flowchart transitions to block 790 which initiates a CPLD-to-CPLP logic trust establishment.

This same process of FIG. 7 for the HPM-CPLD and SCM-CPLD logic trust establishment can be repeated for any or all the other pairs of CPLDS (and/or FPGAs). For example, the HPM-CPLD and the X-CPLD can use a similar method for logic trust establishment, with a major difference being that they would use their appropriate respective expected tokens instead. As another example, the SCM-CPLD can also use a similar method to FIG. 7 to establish a logic trust relationship with the main BMC, in some embodiments.

Therefore, some embodiments of the systems and methods for mutual trust establishment among components of an IHS, described herein, provide for a trusted PROT to act as a centralized expected token management entity. Some embodiments can also support issuing unique per-CPLD tokens if native CPLD capabilities are not used. Some embodiments can use, as the unique token, a CPLD unique ID ("UID") (i.e., serial number, certificate, or similar) of the CPLD. Some embodiments can use HPI to establish trust on the LPI. Some embodiments can provide a capability for an untrusted BMC to establish trust with CPLDs across the LPI. Some embodiments can support inter-CPLD drift-detection.

Some embodiments can provide at least some these features, as well as other features, using a minimal amount of CPLD logic and at a low cost. Some embodiments are highly scalable solutions across complex CPLD hierarchies. If, in the future, secured and/or ROT CPLDs are used to support SPDM over LPI, then some embodiments of the present disclosure can help offload key portions of the protocol to a more capable entity (e.g., expected measurements, identity, nonce-signatures, etc.).

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:

at least one processor; and at least one memory coupled to the at least one processor, wherein the at least one memory comprises program instructions stored thereon that, upon execution by the at least one processor, cause the IHS to:

obtain a plurality of identifiers for a respective plurality of Complex Programmable Logic Devices (CPLDs) or Field Programmable Gate Arrays (FPGAs), wherein the plurality of identifiers comprise an identifier for a first CPLD or FPGA;

in response to a determination that a provision operation is needed for a second CPLD or FPGA, provide, via a high-privileged interface (HPI) characterized, at least in part, by pre-boot access to bootloader code, to the second CPLD or FPGA, an expected handshake token for the first CPLD or FPGA, wherein the expected handshake token comprises a value based, at least in part, on the identifier for the first CPLD or FPGA, and wherein the second CPLD or FPGA uses the expected handshake token to establish trust for communication with the first CPLD or FPGA; and in response to a determination that the provision operation is not needed, lock access to the HPI.

2. The IHS of claim 1, wherein the second CPLD or FPGA is configured to:

receive a handshake token from the first CPLD or FPGA;

compare the handshake token received from the first CPLD or FPGA to the expected handshake token; and based, at least in part, on a match indicated by the comparison, establish trust for communication with the first CPLD or FPGA.

3. The IHS of claim 1, wherein the second CPLD or FPGA is configured to:

receive a handshake token from the first CPLD or FPGA;

compare the handshake token received from the first CPLD or FPGA to the expected handshake token; and based, at least in part, on no match indicated by the comparison, perform one or more responsive actions.

4. The IHS of claim 3, wherein the one or more responsive actions comprise set a recover or reprovision mode flag.

5. The IHS of claim 1, wherein the second CPLD or FPGA uses the expected handshake token to establish trust for communication with the first CPLD or FPGA on a low-privileged interface (LPI) characterized, at least in part, by access limited to runtime features after boot.

6. The IHS of claim 5, wherein the LPI comprises either a Serial Peripheral Interface (SPI), a Inter-Integrated Circuit (I²C), or a Universal Asynchronous Receiver-Transmitter (UART) interface.

7. The IHS of claim 1, wherein the HPI provides on-boot access to a Baseboard Management Controller (BMC) bootloader bitstream for authentication by a Platform Root of Trust (PROT).

8. The IHS of claim 7, wherein the HPI comprises a Joint Test Action Group (JTAG) interface.

9. The IHS of claim 1, wherein the at least one processor is a trusted entity.

10. The IHS of claim 9, wherein the at least one processor is a ProT Security Processor.

11. The IHS of claim 1, wherein the identifier for the first CPLD or FPGA comprises a cryptographic identity certificate of the first CPLD or FPGA.

12. The IHS of claim 1, wherein the first CPLD or FPGA is a Secure Control Module (SCM) CPLD, and wherein the second CPLD or FPGA is a Host Processor Module (HPM) CPLD.

13. The IHS of claim 1, wherein to provide to the second CPLD or FPGA the expected handshake token, the program instructions, upon execution, further cause the at least one processor to:

determine that a flag is set that indicates the provision operation is needed for the second CPLD or FPGA; and provide the expected handshake token to the second CPLD or FPGA based, at least in part, on the flag that is set.

14. The IHS of claim 13, wherein the second CPLD or FPGA is configured to:

determine that at least the expected handshake token is needed; and set the flag that indicates the provision operation is needed for the second CPLD or FPGA.

15. The IHS of claim 1, wherein the expected handshake token is a volatile token characterized, at least in part, as provisioned upon every boot.

16. The IHS of claim 1, wherein the expected handshake token is a non-volatile token characterized, at least in part, as factory-provisioned once in a non-volatile register.

17. A method, comprising:

obtaining, by a platform Root-of-Trust (PROT) or a Baseboard Management Controller (BMC) bootloader of an Information Handling System (IHS), a plurality of identifiers for a plurality of Complex Programmable Logic Devices (CPLDs) or Field Programmable Gate Arrays (FPGAs), wherein the plurality of identifiers comprise an identifier for a first CPLD or FPGA;

in response to determining that a provisioning operation is needed for a second CPLD or FPGA, providing, by the PROT or BMC bootloader via a high-privileged interface (HPI) characterized, at least in part, by pre-boot access to bootloader code, to a second CPLD or FPGA, an expected handshake token for the first CPLD or FPGA, wherein the expected handshake token comprises a value based, at least in part, on the identifier for the first CPLD or FPGA;

in response to determining that the provisioning operation is not needed, lock access to the HPI; and establishing, by the second CPLD or FPGA, trust for communication with the first CPLD or FPGA based, at least in part, on the expected handshake token.

18. The method of claim 17, wherein establishing, by the second CPLD or FPGA, trust for communication with the first CPLD or FPGA further comprises:

receiving, by the second CPLD or FPGA, a handshake token from the first CPLD or FPGA;

comparing, by the second CPLD or FPGA, the handshake token received from the first CPLD or FPGA to the expected handshake token; and based, at least in part, on the comparison indicating a match, establishing, by the second CPLD or FPGA, trust for communication with the first CPLD or FPGA.

19. The method of claim 17, wherein the trust for communication with the first CPLD or FPGA is established for a low-privileged interface (LPI) characterized, at least in part, by providing access limited to runtime features after boot.

20. One or more non-transitory computer-readable storage media that comprise stored program instructions, that when executed on or across one or more processors, cause the one or more processors to:

obtain a plurality of identifiers for individual ones of a plurality of Complex Programmable Logic Devices (CPLDs) or Field Programmable Gate Arrays (FPGAs), wherein the plurality of identifiers comprise an identifier for a first CPLD or FPGA;

determine whether a provision operation is needed for a second CPLD or FPGA, based, at least in part, upon a flag governed by at least one of the plurality of CPLDs or FPGAs;

in response to a determination that the provision operation is needed, provide, via a high-privileged interface (HPI) characterized, at least in part, by pre-boot access to bootloader code, to the second CPLD or FPGA, an expected handshake token for the first CPLD or FPGA, wherein the expected handshake token comprises a value based, at least in part, on the identifier for the first CPLD or FPGA, and wherein the second CPLD or FPGA uses the expected handshake token to establish trust for communication with the first CPLD or FPGA; and in response to a determination that the provision operation is not needed, lock access to the HPI.

\* \* \* \* \*